Oct. 31, 1967 J. R. LINDAMAN 3,350,685

HAMMING MAGNITUDE COMPARATOR USING MULTI-INPUT BINARY THRESHOLD LOGIC ELEMENTS

Filed Aug. 13, 1965 2 Sheets-Sheet 1

INVENTOR
JOHN R. LINDAMAN

BY Thomas J. Nikolai
ATTORNEY

Oct. 31, 1967 J. R. LINDAMAN 3,350,685

HAMMING MAGNITUDE COMPARATOR USING MULTI-INPUT BINARY THRESHOLD LOGIC ELEMENTS

Filed Aug. 13, 1965

2 Sheets-Sheet 2

INVENTOR
JOHN R. LINDAMAN
BY Thomas J. Nikolai
ATTORNEY

United States Patent Office 3,350,685

Patented Oct. 31, 1967

3,350,685

HAMMING MAGNITUDE COMPARATOR USING MULTI-INPUT BINARY THRESHOLD LOGIC ELEMENTS

John R. Lindaman, Minneapolis, Minn., assignor to Sperry Rand Corporation, New York, N.Y., a corporation of Delaware Filed Aug. 13, 1965, Ser. No. 479,419

12 Claims. (Cl. 340—146.2)

Figure 1:
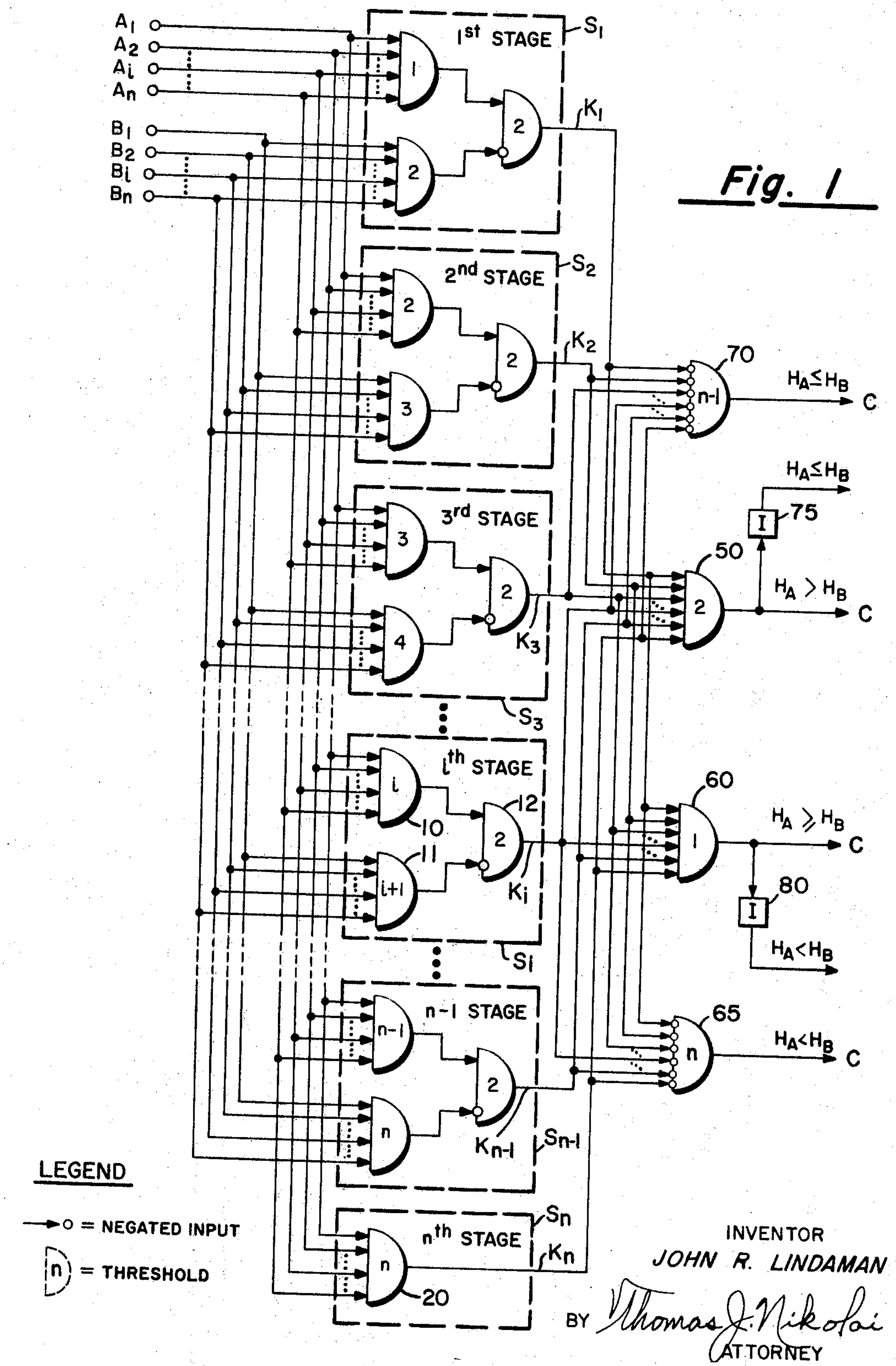

This invention relates to the determination of a comparison of the Hamming magnitude of two binary words and, more particularly, to improved means for comparing the Hamming magnitude of two binary words.

The Hamming magnitude of a binary word is defined as the number of ones contained in the word and is sometimes referred to as the Hamming distance of the word from zero. A comparison of the Hamming magnitude of two binary words is a numerical comparison of the Hamming magnitudes of the individual words. Comparisons of the Hamming magnitude of binary words and means for making such comparisons are currently utilized in error detection and correction such as set forth in an article by R. W. Hamming entitled, "Error Detecting and Correcting Codes," published in the Bell System Technical Journal, vol. XXVI, No. 2, pp. 147–160, April 1950.

In generating a signal representative of a comparison of the Hamming magnitude of two binary words, conventional prior art devices would first serialize each of the words to be compared. Next the serialized words would be transmitted to a one's counter where the number of ones contained in each word would be counted and the results numerically compared. Devices of this type require a relatively large amount of hardware to implement and consume a relatively long period of time in generating a signal representative of the comparison.

When the two binary words to be compared are of the form $A_n \ldots A_i \ldots A_1$ and $B_n \ldots B_i \ldots B_1$ it is observed that the Hamming magnitude of A hereinafter refered to as $H_A$) is greater than or equal to the Hamming magnitude of B (hereinafter referred to as $H_B$) if and only if there exists an integer $p$, $1 \leqslant p \leqslant n$, such that $$\sum_{i=1}^{n} A_i \geqslant p \text{ and } \sum_{i=1}^{n} B_i < p+1$$

It is further observed that $H_A$ is greater than $H_B$ if and only if there exists an integer $p$, $1 \leqslant p \leqslant n$, such that $$\sum_{i=1}^{n} A_i \geqslant p \text{ and } \sum_{i=1}^{n} B_i < p$$

It is proposed by this invention to reduce the hardware and decrease the time necessary to generate a signal representative of a comparison of the Hamming magnitude of two binary words by utilizing these observations and their arithmetical equivalents.

The invention is effected by employing multi-input binary threshold logic elements. There are a variety of circuits available, capable of performing the logical threshold function, which are well-known in the art (such as set forth by E. Goto in "The Parametron, A Digital Computing Element Which Utilizes Parametric Oscillation," Proc. IRE, August 1959, p. 1310; and by W. J. Wray in "Worst Case Design of Variable-Threshold TRL Circuits," IRE Transactions on Electronic Computers, vol. EC–11, No. 3, pp. 382–390; June 1963) and these circuits, of themselves, do not constitute a part of this invention.

The output, K, of a binary threshold logic element having $n$ inputs $Y_n, Y_{n-1}, \ldots Y_i, \ldots Y_2, Y_1$ and threshold $t$, $1 \leqslant t \leqslant n$, can be represented as follows:

$$K = Y_n^t Y_{n-1}^t \ldots Y_i^t \ldots Y_2^t Y_1$$

The value of the binary threshold logic function, K, is determined as follows:

$$K=1 \text{ if } \sum_{i=1}^{n} Y_i \geqslant t$$

and $$K=0 \text{ if } \sum_{i=1}^{n} Y_i < t$$

This merely means that the output of the element will equal a "1" if the number of "1's" on the input lines is equal to or greater than the threshold $t$ or will be a "0" if the number of "1's" on the input lines is less than the threshold $t$.

Figure 2:
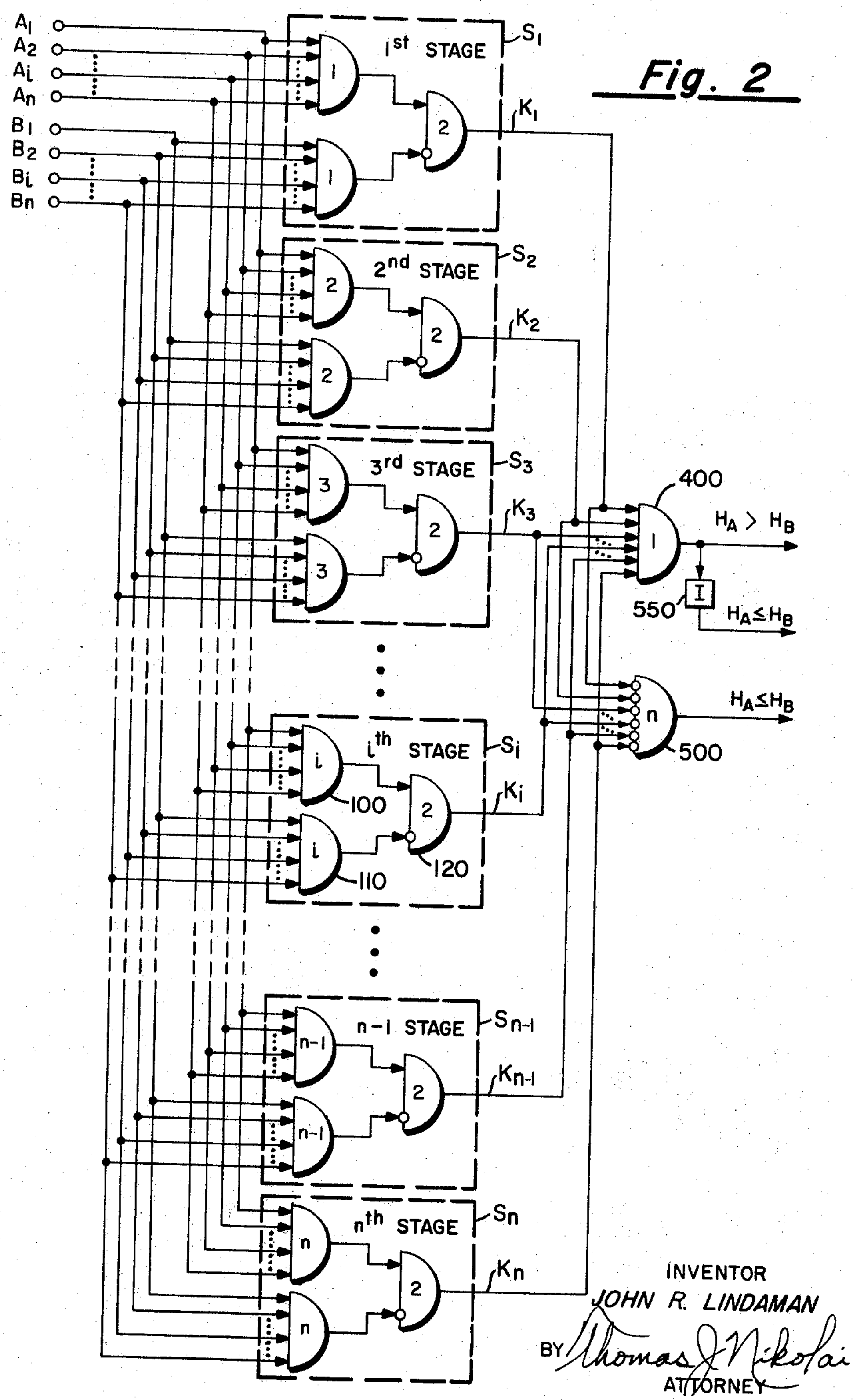

By generating signals in accordance with the logical functions;

$$(H_A \geqslant H_B) = (A_n^p A_{n-1}^p \ldots A_i^p \ldots A_2^p A_1)^2 (\overline{B_n^{p+1} B_{n-1}^{p+1} \ldots B_i^{p+1} \ldots B_2^{p+1} B_1})$$

and $$(H_A > H_B) = (A_n^p A_{n-1}^p \ldots A_i^p \ldots A_2^p A_1)^2 (\overline{B_n^p B_{n-1}^p \ldots B_i^p \ldots B_2^p B_1})$$

the conditions $H_A \geqslant H_B$ in FIG. 1 and $H_A > H_B$ in FIG. 2 can be detected. In these equations, the superscript "$p$" represents the threshold of a first majority logic element receiving the A inputs, the superscript "$p+1$" represents the threshold of a second majority logic element receiving the B inputs and the superscript "2" between the parenthesis represents the threshold of a third majority logic element receiving the true output of the first element and the negated output of the second element. The function $(H_A \geqslant H_B)$, will be "one" if and only if there exists at least one integer, $p$, $1 \leqslant p \leqslant n$, such that $$\sum_{i=1}^{n} A_i \geqslant p \text{ and } \sum_{i=1}^{n} B_i < p+1$$

The function $(H_A > H_B)$ will be "one" if and only if there exists at least one integer $p$, $1 \leqslant p \leqslant n$, such that $$\sum_{i=1}^{n} A_i \geqslant p \text{ and } \sum_{i=1}^{n} B_i < p$$

These signals are generated utilizing binary threshold logic elements. Inspection of FIG. 1 of the drawings indicates that a full comparison can be realized in only three logic levels and utilizing only $3n$ elements.

Thus it is seen that by implementing the observations set forth above with binary threshold logic elements the Hamming magnitude of two binary words can be compared in a relatively short period of time utilizing a relatively small amount of hardware. The novel features which are considered characteristic of this invention are set forth with particularity in the appended claims. The invention itself both as to its organization and method of operation, as well as additional advantages thereof, will be best understood from the following description when read in connection with the accompanying drawings, in which:

FIGURE 1 is a logical block diagram of a preferred embodiment of a full comparator designed in accordance with is invention; and FIGURE 2 is a logical block diagram of another preferred embodiment of a comparator designed in accordance with this invention.

The drawings generally show block diagrams of the basic comparators designed in accordance with the present invention. In these figures each of the blocks represent a binary threshold logic element. The numeral appearing within each of the blocks represents the threshold, $t$, of the element. Arrowheads indicate direction; each normal arrowhead represents a normal input; each small circle "arrowhead" represents a negated input.

With reference now to FIG. 1 of the drawings, a logical block diagram of a full comparator according to the present invention is shown. The full comparator comprises $n$ stages. Each of the stages, $S_i$, $i=1, 2, \ldots n-1$, comprises three binary threshold logic elements arranged to provide an output signal in two logic levels. Two of the three elements of each stage simultaneously generate signals in one level of logic. The third element of each stage utilizes the signals generated in the first logic level to generate another signal in the second logic level. In the $i^{th}$ stage, $S_i$, the input terminals of threshold element 10 are coupled such that the element is capable of receiving $n$ input signals representative of $A_n \ldots A_i \ldots A_1$. Threshold element 10 generates an output signal in the first logic level and has a threshold of "$i$." The input terminals of threshold element 11 are coupled such that the element is capable of receiving $n$ input signals representative of $B_n \ldots B_i \ldots B_1$. Threshold element 11 also generates an output signal in the first logic level and has a threshold of "$i+1$." The output terminals of threshold elements 10 and 11 are coupled to the input terminals of threshold element 12. Threshold element 12 generates an output signal in the second logic level and has a threshold of two (2).

The $n^{th}$ stage, $S_n$, comprises one threshold element, 20, the input terminals of which are coupled such that the element is capable of receiving $n$ input signals representative of $A_n \ldots A_i \ldots A_1$. Threshold element 20 generates an output signal in one logic level and has a threshold of "$n$."

The output terminal of each of the $n$ stages is coupled to an input terminal of both threshold element 50 and threshold element 60. Threshold elements 50 and 60 each generate a signal in one logic level. The threshold of element 50 is two (2) and the threshold of element 60 is one (1).

In operation each of the stages, $S_i$, $i=1, 2, \ldots n-1$, of the full comparator of FIG. 1 receives signal representations of $A_n \ldots A_i \ldots A_1$ and $B_n \ldots B_i \ldots B_1$. In the $i^{th}$ stage, $S_i$, threshold element 10 receives signal representations of $A_n \ldots A_i \ldots A_1$ and generates a signal in accordance with the logical function, $A_n^i \ldots A_i^i \ldots A_1$ which is transmitted to threshold element 12. Threshold element 11 receives signal representations of $$B_n \ldots B_i \ldots B_1$$

and generates a signal in accordance with the logical function, $$B_n^{i+1} \ldots B_i^{i+1} \ldots B_1$$

which is transmitted to and inverted by (or inverted and transmitted to) threshold element 12.

Threshold element 12 receives signal representations of the logical functions, $$A_n^i \ldots A_i^i \ldots A_i \text{ and } B_n^{i+1} \ldots B_i^{i+1} \ldots B_1$$

and generates a signal in accordance with the logical function:

$$K_i = (A_n^i \ldots A_i^i \ldots A_1)^2 (\overline{B_n^{i+1} \ldots B_i^{i+1} \ldots B_1})$$

wherein the superscripts "$i$" indicate the threshold of the first majority logic element 10 receiving the A inputs, the superscripts "$i+1$" indicate the threshold of the second majority logic element 11 receiving the B inputs and the superscript "2" between the parenthetical expressions indicates the threshold of a third majority logic element 12 receiving the true output of the first element 10 and the negated output of the second element 11.

This function is representative of the output of each of the stages $S_i$, $i=1, 2, \ldots n-1$.

Element 20, of the $n^{th}$ stage $S_n$, receives signals representative of $A_n \ldots A_i \ldots A_1$ and generates a signal in accordance with the logical function, $$K_n = A_n^n \ldots A_i^n \ldots A_1$$

The output signals generated by each stage are transmitted both to threshold element 60 and threshold element 50. Threshold element 60 generates a signal representative of the logical function;

$$(H_A \geqslant H_B) = [(A_n^n \ldots A_i^n \ldots A_1)]^1 [(A_n^{n-1} \ldots A_i^{n-1} \ldots A_1)^2 (\overline{B_n^n \ldots B_i^n \ldots B_1})]^1 \ldots [(A_n^i \ldots A_i^i \ldots A_1)^2 (\overline{B_n^{i+1} \ldots B_i^{i+1} \ldots B_1})]^1 \ldots [(A_n^1 \ldots A_i^1 \ldots A_1)^2 (\overline{B_n^2 \ldots B_i^2 \ldots B_1})]$$

This signal represents a logical "one" when and only when $H_A \geqslant H_B$ wherein the expression in the first set of brackets relates to the output of the $n^{th}$ stage, the second set of brackets relates to the output of the $n-1^{th}$ stage, the third set of brackets relates to the output of the $i^{th}$ stage, and the fourth set of brackets represents the output of the $1^{st}$ stage. The superscript "2" within the brackets represents the threshold of the third element of that particular stage. The superscript "1" between brackets represent the threshold of element 60.

Threshold element 50 generates a signal representative of the logical function;

$$(H_A > H_B) = [A_n^n \ldots A_i^n \ldots A_1]^2 [(A_n^{n-1} \ldots A_i^{n-1} \ldots A_1)^2 (\overline{B_n^n \ldots B_i^n \ldots B_1})]^2 \ldots [(A_n^i \ldots A_i^i \ldots A_1)^2 (\overline{B_n^{i+1} \ldots B_i^{i+1} \ldots B_1})]^2 \ldots [(A_n^1 \ldots A_i^1 \ldots A_1)^2 (\overline{B_n^2 \ldots B_i^2 \ldots B_1})]$$

wherein the logic notation is as described above with the superscript "2" between brackets representing the threshold of element 50.

This signal represents a logical "one" when and only when $H_A > H_B$. From these two functions the remaining three can be readily generated as follows:

$$\overline{H_A \geqslant H_B} = H_A < H_B$$

$$\overline{H_A > H_B} = H_A \leqslant H_B$$

$$(H_A \geqslant H_B) \text{ and } (\overline{H_A > H_B}) = (H_A = H_B)$$

A signal representative of $(H_A \leqslant H_B)$ can be obtained directly by setting the threshold of element 50 to "$n-1$" and inverting all of the inputs to the element as shown by element 70 in FIG. 1 or by adding another element 75 in invert the output of element 50. In each a case the logical function would be;

$$(H_A \leqslant H_B) = [\overline{A_n^n \ldots A_i^n \ldots A_1}]^{n-1} [\overline{(A_n^{n-1} \ldots A_i^{n-1} \ldots A_1)^2 (\overline{B_n^n \ldots B_i^n \ldots B_1})}]^{n-1} \ldots [\overline{(A_n^i \ldots A_i^i \ldots A_1)^2 (\overline{B_n^{i+1} \ldots B_i^{i+1} \ldots B_1})}]^{n-1} \ldots [\overline{(A_n \ldots A_i^1 \ldots A_1)^2 (\overline{B_n^2 \ldots B_i^2 \ldots B_1})}]$$

wherein the logic notation is as described above with the superscript "$n-1$" between brackets representing the threshold of element 70.

This signal represents a logical "one" when and only when $H_A \leqslant H_B$. Similarly, a signal representative of $(H_A < H_B)$ can be directly obtained by setting the threshold of element 60 to "$n$" and inverting all of the inputs to the element as shown by element 65 in FIG. 1 or by adding another element 80 to insert the output of element 60. In such a case the logical function would be $$H_A < H_B = [\overline{A_n^n \ldots A_i^n \ldots A_1}]^n [\overline{(A_n^{n-1} \ldots A_i^{n-1} \ldots A_1)^2 (\overline{B_n^n \ldots B_i^n \ldots B_1})}]^n \ldots [\overline{(A_n^i \ldots A_i^i \ldots A_1)^2 (\overline{B_n^{i+1} \ldots B_i^{i+1} \ldots B_1})}]^n \ldots [\overline{(A_n^1 \ldots A_i^1 \ldots A_1)^2 (\overline{B_n^2 \ldots B_i^2 \ldots B_1})}]$$

This signal will represent a logical "one" when and only when $H_A < H_B$ wherein the superscript "$n$" between brackets represents the threshold of element 65.

FIG. 1 shows only two threshold logic elements in the third logical level (i.e.: elements 50 and 60). The two elements shown are merely exemplary and it is to be understood that any number of elements, from one to four as set forth above, may be included.

In general, the outputs of the Hamming magnitude comparator of FIG. 1 can be represented as follows:

$$C = K_n^m K_{n+1}^m \ldots K_i^m \ldots K_1$$

where the superscript "*m*" is the threshold of one of the majority logic elements 50, 60, 65 or 70.

This function is defined as follows:

$C=(H_A \geqslant H_B)$ when $m=1$ as shown by element 60,
$C=(H_A > H_B)$ when $m=2$ as shown by element 50,
$C=(H_A \leqslant H_B)$ when $m=n-1$ and all inputs are inverted as shown by element 70, and
$C=(H_A < H_B)$ when $m=n$ and all inputs are inverted as shown by element 65.

If one of the two words to be compared, such as for example B, is available in its inverted form $$\overline{B}_n \ldots \overline{B}_i \ldots \overline{B}_1$$

then the inputs to the second logic level elements of the full comparator of FIG. 1, which are shown to be inverted, need not be inverted. The elements of the first logic level, which receive signal representations of $$B_n \ldots B_i \ldots B_1$$

as inputs, would then receive signal representations of $$\overline{B}_n \ldots \overline{B}_i \ldots \overline{B}_1$$

as inputs, and have thresholds of $j$, $j=n+1-i$ where $i=1, 2, 3 \ldots n-1$ and indicates the stage to which the element belongs. Threshold element 11, of the $i^{th}$ stage $S_i$, would receive signal representations of $$\overline{B}_n \ldots \overline{B}_i \ldots \overline{B}_1$$

have a threshold of $n+1-i$, and generate a signal in accordance with the logical function $$\overline{B}_n^{n+1-i} \ldots \overline{B}_i^{n+1-i} \ldots \overline{B}_1$$

Using the logic notation described above, the output of element 12 would then become, $$K_i=(A_n^i \ldots A_i^i \ldots A_1)^2(\overline{B}_n^{n+1-i} \ldots \overline{B}_i^{n+1-i} \ldots \overline{B}_1),$$

$$\text{i.e.:}(A_n^i \ldots A_i^i \ldots A_1)^2(\overline{B_n^{i+1} \ldots B_i^{i+1} \ldots B_1})=$$
$$(A_n^i \ldots A_i^i \ldots A_1)^2(\overline{B}_n^{n+1-i} \ldots \overline{B}_i^{n+1-i} \ldots \overline{B}_1)$$

The representation of $K_i$ is considered to be the full logical equivalent of the logical expression of $K_i$ set forth above.

With reference now to FIG. 2 of the drawings, a logical block diagram of another comparator according to the present invention is shown. The logic notation described above will be used throughout the discussion of FIG. 2. The comparator comprises *n* stages. Each of the stages, $S_i$, $i=1, 2, \ldots n$, comprises three binary threshold elements arranged to provide an output signal in two logic levels. Two of the three elements of each stage simultaneously generate signals in one level of logic. The third element of each stage utilizes the signals generated in the first logic level to generate another signal in the second level. In the $i^{th}$ stage. $S_i$, the input terminals of threshold element 100 are coupled such that the element is capable of receiving *n* input signals representative of $$A_n \ldots A_i \ldots A_1$$

The input terminals of threshold element 110 are coupled such that the element is capable of receiving *n* input signals representative of $B_n \ldots B_i \ldots B_1$. Both threshold elements 100 and 110 generate an output signal in one logic level and have a threshold of "*i*." The output terminals of of both threshold elements 100 and 110 are coupled to the input terminals of threshold element 120. Threshold element 120 generates an output signal in the second logic level and has a threshold of two (2).

The output terminal, of each of the *n* stages, is coupled to an input terminal of threshold element 400. Threshold element 400 generates a signal in one level of logic and has a threshold of one (1).

In operation each of the stages, $S_i$, $i=1, 2 \ldots n$, of the comparator of FIG. 2 receives signal representations of $A_n \ldots A_i \ldots A_1$ and $B_n \ldots B_i \ldots B_1$. In the $i^{th}$ stage, $S_i$, threshold element 100 receives signal representations of $A_n \ldots A_i \ldots A_n$ and generates a signal in accordance with the logical function, $A_n^i \ldots A_i^i \ldots A_1$, which is transmitted to threshold element 120. Threshold element 110 receives signal representations of $$B_n \ldots B_i \ldots B_1$$

and generates a signal in accordance with the logical function, $B_n^i \ldots B_i^i \ldots B_1$, which is transmitted to and inverted by (or inverted and transmitted to) threshold element 120.

Threshold element 120 receives signal representations of the logical functions, $A_n^i \ldots A_i^i \ldots A_1$ and $B_n^i \ldots B_i^i \ldots B_1$, and generates a signal in accordance with the logical function:

$$K_i=(A_n^i \ldots A_i^i \ldots A_1)^2(\overline{B_n^i \ldots B_i^i \ldots B_1})$$

This function is representative of the output of each of the stages $S_i$, $i=1, 2, \ldots n$.

The output signals generated by each stage are transmitted to threshold element 400, which generates a signal representative of the logical function $$(H_A > H_B)=[(A_n^n \ldots A_i^n \ldots A_1)^2(\overline{B_n^n \ldots B_i^n \ldots B_1})]^1$$
$$[(A_n^{n-1} \ldots A_i^{n-1} \ldots A_1)^2(\overline{B_n^{n-1} B_i^{n-1} B_1})]^1$$
$$\ldots[(A_n^i \ldots A_i^i \ldots A_1)^2(\overline{B_n^i \ldots B_i^i \ldots B_1})]^1$$
$$\ldots[(A_n^1 \ldots A_i^1 \ldots A_1)^2(\overline{B_n^1 \ldots B_i^1 \ldots B_1})]$$

This signal represents a logical "one" when and only when $H_A > H_B$.

A signal representative of $(H_A \leqslant H_B)$ can be directly obtained by setting the threshold of element 400 to "*n*" and inverting all of the inputs to the element as shown by element 500 in FIG. 2 or by adding another element 550 to invert the output of element 400. In such a case the logical function would be;

$$(H_A \leqslant H_B)=[\overline{(A_n^n \ldots A_i^n \ldots A_1)^2(\overline{B_n^n \ldots B_i^n \ldots B_1})}]^n$$
$$\overline{[(A_n^{n-1} \ldots A_i^{n-1} \ldots A_1)^2(\overline{B_n^{n-1} \ldots B_i^{n-1} \ldots B_1})}]^n$$
$$\ldots[(A_n^i \ldots \overline{A_i^i \ldots A_1)^2(\overline{B_n^i \ldots B_i^i \ldots B_1})}]^n$$
$$\ldots[(A_n^1 \ldots \overline{A_i^1 \ldots A_1)^2(\overline{B_n^1 \ldots B_i^1 \ldots B_1})}]$$

This signal will represent a logical "one" when and only when $H_A \leqslant H_B$.

FIG. 2 shows only one element in the third logic level, namely element 400. This is merely exemplary and it is to be understood that two elements, as set forth above, may be included.

In general, the output of the Hamming magnitude comparator of FIG. 2 can be represented as follows;

$$C = K_n^m K_{n-1}^m \ldots K_i^m \ldots K_1$$

This function is defined as follows;

$C=(H_A > H_B)$ when $m=1$, and
$C=(H_A \leqslant H_B)$ when $m=n$ and all inputs are inverted.

If one of the two words to be compared, such as for example B, is available in its inverted form, $\overline{B}_n \ldots \overline{B}_i \ldots \overline{B}_1$, then the inputs to the second logic level elements of the comparator of FIG. 2, which are shown to be inverted, need not be inverted. The elements of the first logic level, which receive signal representations of $B_n \ldots B_i \ldots B_1$ as inputs, would then receive signal representations of $\overline{B}_n \ldots \overline{B}_i \ldots \overline{B}_1$ as inputs, and have thresholds of $j$, $j=n+1-i$ where $i=1, 2, 3 \ldots n$ and indicates the stage to which the element belongs. Threshold element 110, of the $i^{th}$ stage $S_i$, would receive signal representations of $\overline{B}_n \ldots \overline{B}_i \ldots \overline{B}_1$, have a threshold of $n+1-i$, and generate a signal in accordance with the logical function $$\overline{B}_n^{n+1-i} \ldots \overline{B}_i^{n+1-i} \ldots \overline{B}_1$$

The output of element 120 would then become, $$K_i=(A_n^i \ldots A_i^i \ldots A_1)^2(\overline{B}_n^{n+1-i} \ldots \overline{B}_i^{n+1-i} \ldots \overline{B}_1)$$

$$i.e.: (A_n^i \ldots A_i^i \ldots A_1)^2(\overline{B_n^{i+1} \ldots B_i^{i+1} \ldots B_1})=$$
$$(A_n^i \ldots A_i^i \ldots A_1)^2(\overline{B}_n^{n+1-i} \ldots \overline{B}_i^{n+1-i} \ldots \overline{B}_1)$$

This representation of $K_i$ is considered to be the full logical equivalent of the logical expression of $K_i$ set forth above.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

What is claimed is:

1. A Hamming magnitude comparator for generating a signal C representative of a comparison of two binary words of the form $A_n \ldots A_i \ldots A_1$ and $B_n \ldots B_i \ldots B_1$ whereby the Hamming magnitude, $H_A$, of the binary word A is compared to the Hamming magnitude, $H_B$, of the binary word B, said comparator comprising:

$n$ signal generating stages, $S_i$, $i=1, 2, \ldots n$, for generating $n$ signals representative of $K_i$, each of said signal generating stages, $S_i$, $i=1, 2 \ldots n-1$ for generating a signal representative of $K_i$, comprising;

first and second threshold circuit means for receiving input signal representations of $A_n \ldots A_i \ldots A_1$ and $B_n \ldots B_i \ldots B_1$ respectively and generating first and second output signals and third threshold circuit means coupled to said first and second circuit means for utilizing said first and second output signals to generate a signal representative of $K_i$ in accordance with the logical function, $$K_i=(A_n^i \ldots A_i^i \ldots A_1)^2(\overline{B_n^{i+1} \ldots B_i^{i+1} \ldots B_1})$$

where superscript "$i$" indicates the threshold of said first circuit means, superscript "$i+1$" indicates the threshold of said second circuit means and superscript "2" indicates the threshold of said third circuit means, said signal generating stage, $S_n$, for generating $K_n$, comprising;

a single threshold circuit means for receiving signal representations of $A_n \ldots A_i \ldots A_1$, and generating a signal representative of $K_n$ in accordance with the logical function, $$K_n=A_n^n \ldots A_i^n \ldots A_1$$

where superscript "$n$" indicates the threshold of said single threshold circuit means, and an output threshold circuit means coupled to each of said $n$ signal generating stages, $S_i$, $i=1, 2 \ldots n$ for utilizing said signals $K_i$, $i=1, 2, \ldots n$, to generate a signal representative of C.

2. A comparator as defined in claim 1 in which C is generated in accordance with the logical function, $$C=K_n^1 K_{n-1}^1 \ldots K_i^1 \ldots K_1$$

wherein the superscript "1" indicates the threshold of said output threshold circuit means whereby the output $H_A \geq H_B$ is produced, and each of said generating means is a binary threshold logic element.

3. A comparator as defined in claim 1 in which C is generated in accordance with the logical function, $$C=K_n^2 K_{n-1}^2 \ldots K_i^2 \ldots K_1$$

wherein the superscript "2" indicates the threshold of said output threshold circuit means whereby the output $H_A > H_B$ is produced, and each of said generating means is a binary threshold logic element.

4. A comparator as defined in claim 1 in which C is generated in accordance with the logical function, $$C=\overline{K}_n^{n-1}\overline{K}_{n-1}^{n-1} \ldots \overline{K}_i^{n-1} \ldots \overline{K}_1$$

wherein the superscript "$n-1$" indicates the threshold of said output threshold circuit means whereby the output $H_A \leq H_B$ is produced, and each of said generating means is a binary threshold logic element.

5. A comparator as defined in claim 1 in which C is generated in accordance with the logical function, $$C=\overline{K}_n^n\overline{K}_{n-1}^n \ldots \overline{K}_i^n \ldots \overline{K}_1$$

wherein the superscript "$n$" indicates the threshold of said output threshold circuit means whereby the output $H_A < H_B$ is produced, and each of said generating means is a binary threshold logic element.

6. A signal generating stage for generating a signal, $K_i$, corresponding to a comparison of two binary words of the form $A_n \ldots A_i \ldots A_1$ and $B_n \ldots B_i \ldots B_1$ comprising:

(a) a first threshold circuit having a threshold of $i$ and receiving only signal representations of $A_n \ldots A_i \ldots A_1$ for producing a first output signal, (b) a second threshold circuit having a threshold of $i+1$ and receiving only signal representation of $B_n \ldots B_i \ldots B_1$ for producing a second output signal, (c) means coupled to said second threshold circuit for inverting said second output signal, and (d) a third threshold circuit having a threshold of 2 coupled to the output of said inverting means and said first threshold circuit for utilizing said first and inverted outputs to generate a comparison signal representative of $K_i$.

7. A signal generating stage as defined in claim 6 in which each of said generating means is a binary threshold logic element.

8. A Hamming magnitude comparator for generating a signal C representative of a comparison of two binary words of the form $A_n \ldots A_i \ldots A_1$ and $B_n \ldots B_i \ldots B_1$ whereby the Hamming magnitude, $H_A$, of the binary word A is compared with the Hamming magnitude, $H_B$, of the binary word B, said comparator comprising:

$n$ signal generating stages, $S_i$, $i=1, 2 \ldots n$ for generating $n$ comparison signals each representative of $K_i$, each of said stages, $S_i$, comprising:

first and second threshold circuit means each having a threshold of $i$ and receiving only signal representations of $A_n \ldots A_i \ldots A_1$ and $B_n \ldots B_i \ldots B_1$ respectively for generating first and second output signals, means coupled to said threshold circuit for inverting said second output signal, and third threshold circuit means having a threshold of 2 coupled to said first threshold circuit and said inverting means for utilizing said first and said inverted output signals to generate a comparsion signal representative of $K_i$ and an output threshold circuit means coupled to each of said $n$ signal generating stages, $S_i$, $i=1, 2 \ldots n$, for utilizing said comparison signals $K_i$, $i=1, 2 \ldots n$, to generate a signal representative of C.

9. A comparator as defined in claim 8 in which C is generated in accordance with the logical function, $$C=K_n^1 K_{n-1}^1 \ldots K_i^1 \ldots K_1$$

wherein the superscript "1" indicates the threshold of said output threshold circuit means whereby the output $H_A > H_B$ is produced, and each of said generating means is a binary threshold logic element.

10. A comparator as defined in claim 8 in which C is generated in accordance with the logical function $$C=\overline{K}_n^n \overline{K}_{n-1}^n \ldots \overline{K}_i^n \ldots \overline{K}_1$$

where the superscript "$n$" indicates the threshold of said output threshold circuit means whereby the output $H_A \leq H_B$ is produced, and each of said generating means is a binary threshold logic element.

11. A signal generating stage for generating a comparison signal, $K_i$, corresponding to two binary words of the form $A_n \ldots A_i \ldots A_1$ and $B_n \ldots B_i \ldots B_1$, comprising;

first and second threshold circuit means each having a threshold of $i$ and receiving only signal representations of $A_n \ldots A_i \ldots A_1$ and $B_n \ldots B_i \ldots B_1$ respectively for generating first and second output signals respectively, means coupled to said second threshold circuit for inverting said second output signal, and third threshold circuit means having a threshold of 2 coupled to said first threshold circuit and said inverting means for utilizing said first and said inverted output signals to generate a comparison signal representative of $K_i$.

12. A signal generating stage as defined in claim 11 in which each of said generating means is a binary threshold logic element.

References Cited

UNITED STATES PATENTS 3,124,677 3/1964 Miller ............. 235—177

MALCOLM A. MORRISON, *Primary Examiner.*

V. SIBER, *Assistant Examiner.*